Aug. 19, 1958
R. B. BAGBY
2,847,883
DRILL JIG
Filed March 23, 1955
3 Sheets-Sheet 1
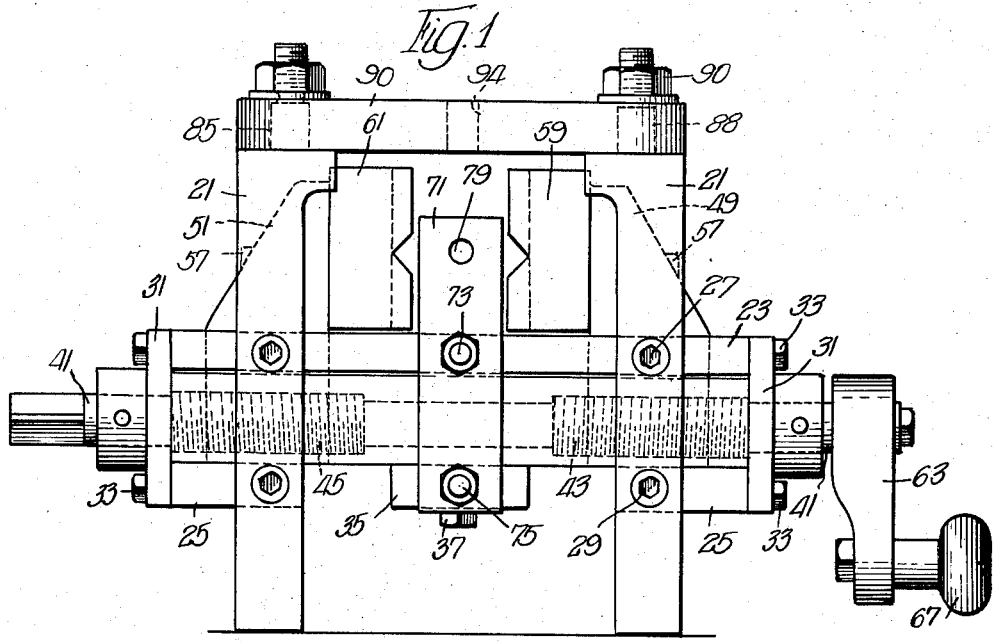
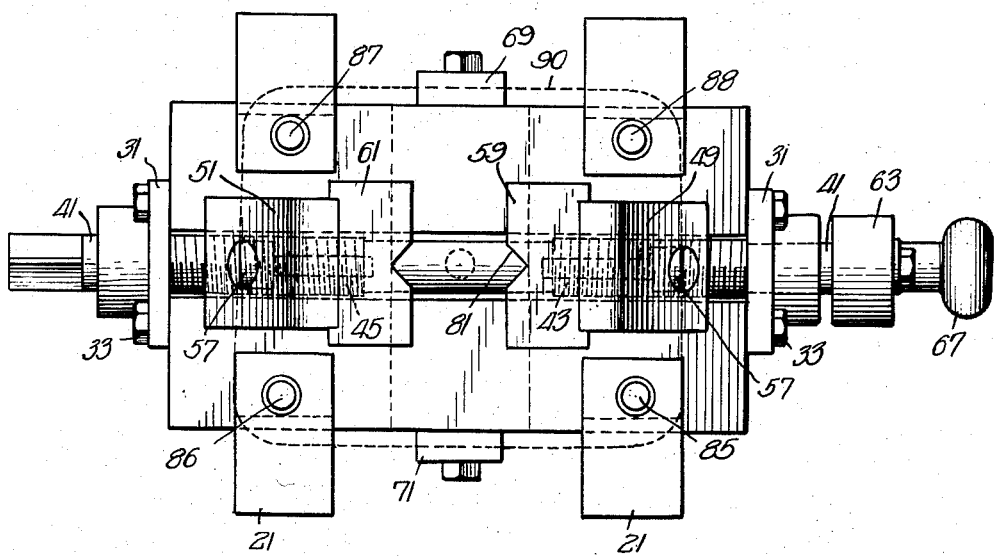
INVENTOR.
Ralph B. Bagby,
BY Aug. 19, 1958     R. B. BAGBY     2,847,883
DRILL JIG
Filed March 23, 1955     3 Sheets-Sheet 2
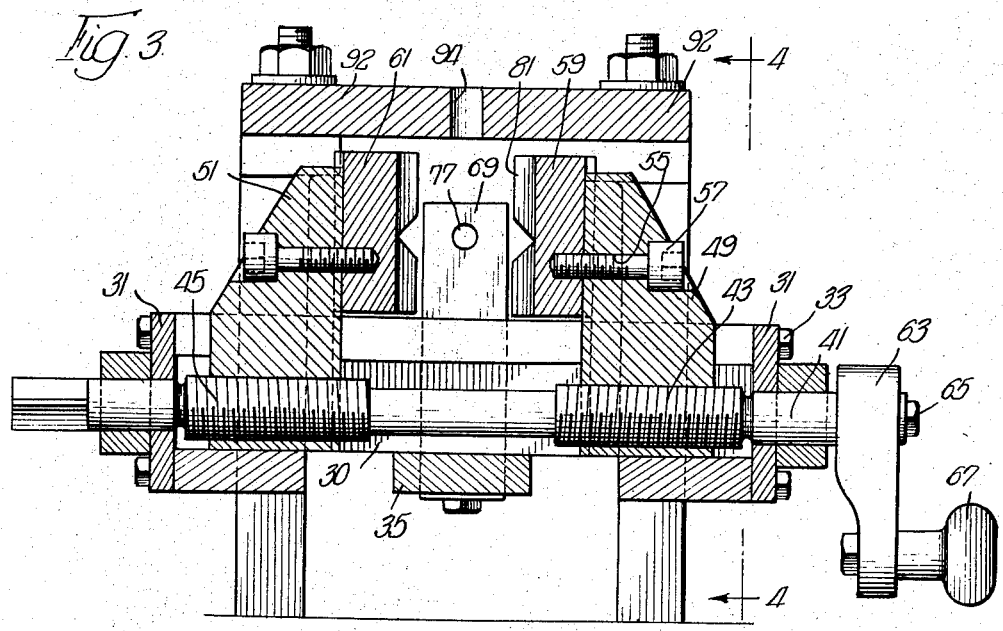
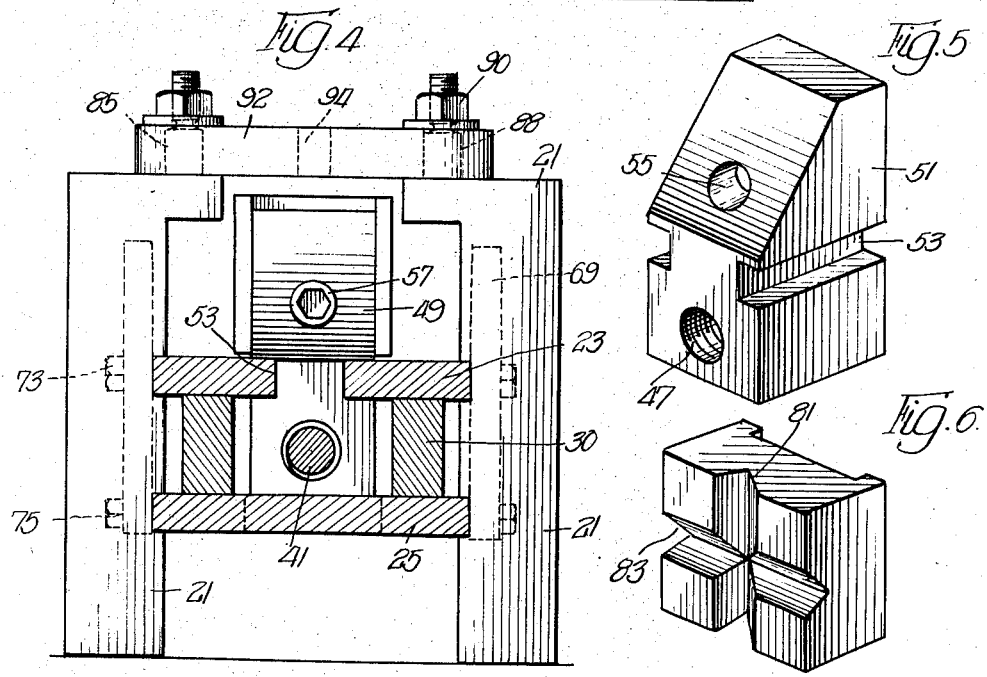
INVENTOR.
Ralph B. Bagby,
BY Aug. 19, 1958  R. B. BAGBY  2,847,883
DRILL JIG
Filed March 23, 1955  3 Sheets-Sheet 3
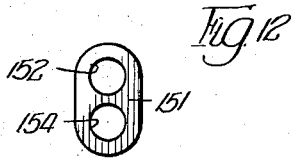
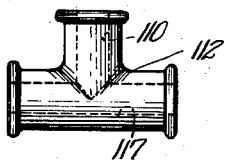
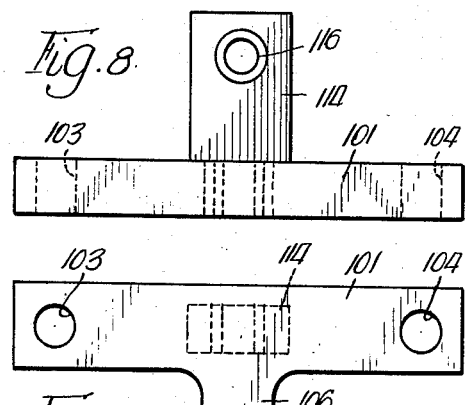
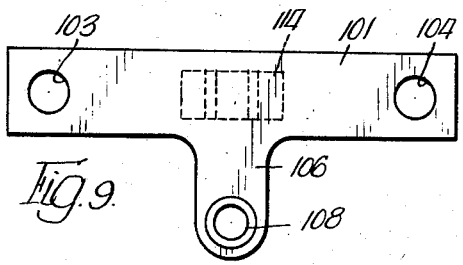
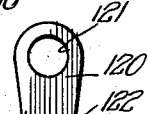
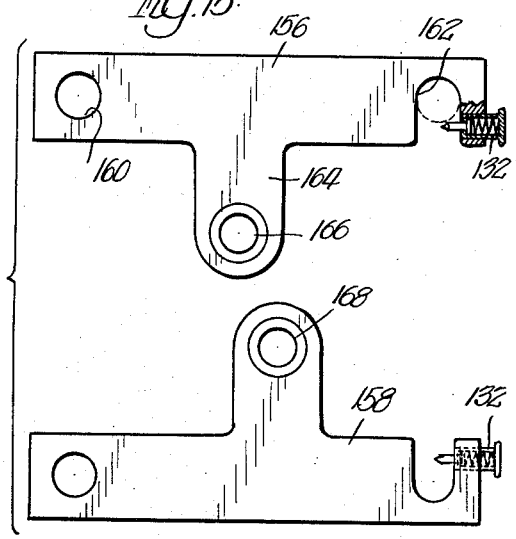
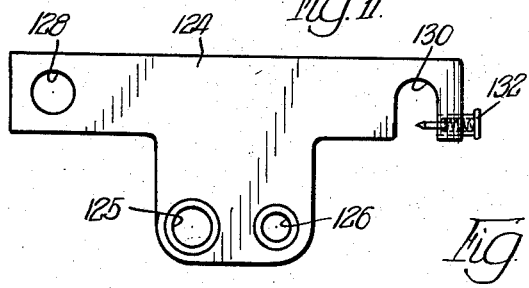
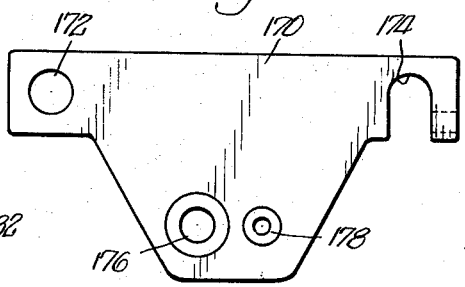
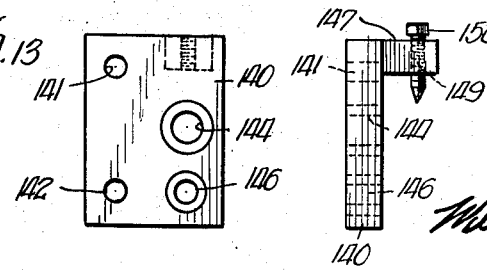
INVENTOR.
Ralph B. Bagby,
BY
ATTYS.

2,847,883

DRILL JIG

Ralph B. Bagby, Evanston, Ill.

Application March 23, 1955, Serial No. 496,233

2 Claims. (Cl. 77—62)

This invention relates to a new and improved drill jig and more particularly to an equalizing drill jig of the vise type especially adapted for use with a drill press.

In the manufacture of machine parts from castings, forgings and the like, the inter-changeability of parts is often dependent upon the exact location of drilled holes in the parts. Duplication of hole locations has often been maintained through the use of drill jigs. Such jigs are special tools provided with some means for holding the part to be drilled and means for guiding the drill or cutting tool. In large scale production a special drill jig may be made for each part. Where production is moderate in quantity a standard type of jig may be used to hold the work and to hold removable plates or other guide means which may be made for a specific part in order to provide accuracy of drilling such as to permit inter-changeability of parts.

It is an object of the present invention to provide a new and improved drill jig adapted to center the workpiece secured therein.

It is a further object to provide such a drill jig having removable jaws whereby jaws of differing shape and design may be used to adapt the jig to workpieces of different shapes.

It is an additional object to provide a jig having adjustable and detachable guide plates carrying hardened bushings for guiding a drill.

It is another object to provide a construction of this character in which the workpiece may be held and drills guided to drill holes accurately through a wide range of angular positions.

It is also an object to provide a jig adapted for use with a drill press to permit work to be done on such a press which has heretofore required the use of a lathe.

It is an additional object to provide a jig adapted to minimize the handling and clamping of the workpiece and to permit multiple drilling to be done with a single clamping, including drilling of closely adjacent or intersecting holes.

It is another object to provide a device which is simple in design and construction and adapted for commercial production and use.

Other and further objects will appear as the description proceeds.

I have shown certain preferred embodiments of the invention in the accompanying drawings, in which—

Fig. 1 is a side elevation of the apparatus,

Fig. 2 is a plan view of the apparatus of Fig. 1, with the guide plate removed and indicated in broken lines, Fig. 3 is a vertical longitudinal section taken on the center line of the apparatus, Fig. 4 is a transverse section taken on line 4—4 of Fig. 3, Fig. 5 is a perspective view of one of the master jaws, Fig. 6 is a perspective view of one of the separable jaws, Fig. 7 is an elevation of one form of workpiece, Fig. 8 is an elevation of a guide plate for use with the workpiece of Fig. 7, Fig. 9 is a plan view of the guide plate of Fig. 8, Fig. 10 is a plan view of another form of workpiece, Fig. 11 is a plan view of a guide plate for use with the workpiece of Fig. 10, Fig. 12 is a plan view of another form of workpiece, Fig. 13 is a plan view of a form of guide plate adapted for use with the workpiece of Fig. 12, Fig. 14 is a side elevation of the guide plate of Fig. 13, Fig. 15 is an exploded view of two swingable guide plates used alternately on a workpiece to drill holes too close together for use of a single guide plate, and Fig. 16 is a plan view of still another form of guide plate.

Referring particularly to Figs. 1 to 4 of the drawings, the device comprises supporting means including four legs 21 to which are secured a pair of longitudinally extending spaced base plates 23 which also serve as guiding means. The legs 21 are also separated by end cross braces 25. The base plates 23 are secured to the legs by means of hollow-headed cap screws 27 and the cross braces are similarly secured by screws 29. The longitudinal braces 30 extend between the base plates 23 and cross braces 25 as best shown in Fig. 4. The transversely extending end plates 31 are secured to the ends of the base plates 23 and the outer edges of the cross braces 25 by means of machine screws 33. An additional cross brace 35 extends across the device intermediate the pairs of legs 21, this bracing being connected by hex-headed screws 37 to the underside of the longitudinal braces 30.

The clamping screw 41 has bearing ends, as shown in Fig. 3, which bear in the end plates 31. The clamping screw 41 has the oppositely threaded portions 43 and 45 which engage mating threads in the holes 47 extending through the master jaws 49 and 51. These master jaws, as shown in the perspective view of Fig. 5, are provided with slots 53 along their sides, these slots fitting over the inner edges of the base plates 23 and thus serving to guide the master jaws in their longitudinal movement. The master jaws 49 and 51 are further provided with openings 55 adapted to receive hollow-headed machine screws 57, the ends of which are threaded into separable jaws 59 and 61. One end of the clamping screw 41 is provided with the crank 63, held in place by the machine screw 65, and provided with the operating handle knob 67.

In the construction as shown, the vertically extending jig plates 69 and 71 are shown secured to the apparatus by machine screws 73 extending into the base plates 23 and machine screws 75 extending into the cross brace 35. These jig plates 69 and 71 are provided with the guiding holes 77 and 79 respectively. The separable jaws 59 and 61, shown in Figs. 1, 2, 3 and 6, are provided with intersecting V-shaped vertical grooves 81 and horizontal grooves 83. As shown the guide holes 77 and 79 are aligned with the intersections of the grooves 81 and 83 so that drills, guided by these holes, will operate upon a workpiece on that line.

The upper parts of the legs 21 are provided with jig plate studs 85, 86, 87 and 88. These studs have upper threaded portions adapted to receive nuts 90 if it is desired to clamp the jig plate 92 firmly in place. The jig plate 92, as shown, is provided with a central guide hole 94 which would guide a drill along the axis of the vertical grooves 81 in the separable jaws 59 and 61. It is to be noted that the jig plate guide studs 85, 86, 87 and 88 are not placed on the corners of a rectangle. The spacing between studs 85 and 86 is greater than between studs 87 and 88. Thus when using a jig plate having any guide holes located off-center, the jig plate cannot be incorrectly placed on the studs. As shown, the opposite pairs of jig plate studs 85 and 86, and 87 and 88 are each placed along lines parallel to the central axis of the apparatus.

Referring now to Figs. 7, 8 and 9, the jig plate shown in Figs. 8 and 9 is suitable for working upon the workpiece shown in Fig. 7. The jig plate 101 is provided with spaced holes 103 and 104 adapted to fit over a pair of jig plate studs on one side of the axis of the apparatus. The plate has an inwardly extending arm 106 into which is fitted a tubular guide member 108 adapted to guide a drill vertically downwardly to make the hole 110 shown in the workpiece 112 in Fig. 7. The jig plate 101 is further provided with a downwardly extending arm 114 carrying a bushing 116 adapted to guide a drill horizontally to make the horizontal hole 117 in the workpiece 112.

It will be understood that the removable jaws may take a wide variety of shapes suitable for clamping and holding in definite fixed position various types and shapes of workpieces. In Figs. 10 and 11 there are shown a workpiece 120 having a pair of spaced holes 121 and 122 drilled therethrough. Fig. 11 shows a suitable drill jig plate 124 adapted for drilling the holes in the workpiece 120. The plate 124 carries the bushings 125 and 126 to guide the drills accurately for that purpose. The jig plate 124 is provided with a hole 128 adapted to fit over one jig plate stud on the apparatus and an open-sided recess 130 adapted to fit over another such stud. A spring pin 132 is fitted in the side of the recess 130 having an inner end adapted to snap against the inner face of the jig plate stud to retain the plate 124 in operating position. The jig plate 124 may swing around the axis of hole 128 to clear the work space for removing and replacing workpieces or for doing other work on such pieces.

In Figs. 13 and 14 a different type of jig plate is shown. This plate is adapted to be used in drilling holes where it is not desired to center the work but to have the holes spaced a predetermined distance from the face of one of the removable jaws. The plate 140 is provided with a pair of holes 141 and 142 through which may pass studs to locate it relative to the separable jaws. The plate 140 also carries the guide sleeves 144 and 146 to guide the drill in making vertical holes in the workpiece. The plate 140 has a downwardly extending ear 147, as best shown in Fig. 14, and this ear has a threaded opening 149 therethrough. A suitable stop screw 150 is threaded into this opening 149 to locate the workpiece accurately in that direction so as to assure drilling the holes in the proper position.

Fig. 12 shows a workpiece 151 having holes 152 and 154 drilled therein. These holes are too close together to be drilled by guide holes in a single jig plate, since the holes in the jig plate are provided with hardened bushings. Consequently, a pair of jig plates 156 and 158 is provided as shown in Fig. 15. The plate 156 is provided with the opening 160 adapted to fit over a jig stud and the notch or recess 162 adapted to be swung into engagement with the related jig plate stud. This plate 156 has an inwardly extending portion 164 carrying the bushing 166 adapted to guide a drill to drill one of the two holes in the workpiece 151. The jig plate 158 is similar in all respects to plate 156 with the exception that the bushing 168 is differently located so as to properly drill the closely adjacent hole in the workpiece. This work may be quickly done without removing the jig plates, since each can be swung about one end to clear the work and to permit the other plate to be swung into operative position.

The jig plate, shown in Fig. 16, is generally similar to those previously described. This plate 170 is provided with a hole 172 to fit upon a jig plate stud and with a notch or recess 174 to engage the adjacent stud. This plate 170 carries the spaced bushings 176 and 178 whereby properly spaced holes of different sizes may be drilled in a workpiece. In this case a single jig plate may be used since the holes are adequately spaced to permit the insertion of the proper bushings in a single plate.

It will be understood that the various forms of jig plates shown are illustrative of a wide variety of such plates which may be employed for use in connection with different types of workpieces. Similarly, a wide variety of separable jaws may be provided, each set being adapted to properly grip and center the particular shape of workpiece for which it is designed. It will also be understood that the apparatus itself may be made in a wide variety of sizes, depending upon the size or range of sizes of the workpieces which it may be designed to accommodate.

It is believed that the operation of the device will have been apparent from the previous detailed description. The handle 67 is used to rotate the crank 63 and thus to rotate the clamping screw 41. The reversely threaded portions 43 and 45 of the screw cause the two master jaws 49 and 51 to move in opposite directions. Rotation of the clamping screw in one direction separates the jaws, while rotation in the other direction moves them together. Thus a single movement of the handle 67 serves to clamp the workpiece between the jaws. Because of the accurate centering of the master jaws on the clamping screw relative to the locations of the jig plate studs, any workpiece will be accurately centered when it is firmly clamped in position. Workpieces will thus always be brought into exactly the same position relative to the properly designed jig plates for use with such pieces, when the jig plates are located upon jig plate studs.

It will be apparent that the apparatus is readily adaptable to a wide variety of uses and to handling a wide variety of shapes. It will guide drilling operation in different locations and different planes relative to the work. The construction is so designed that when the jaws meet, the point of intersection of the diagonals drawn from the four jig plate studs is on their meeting line. Other known mechanical means than the specific right and left hand screws shown, may be employed to operate the jaws equidistantly about their meeting line.

While I have shown certain preferred embodiments of my invention, it is capable of variation to meet differing conditions and requirements and I contemplate such modifications as come within the spirit and scope of the appended claims.

What is claimed is:

1. A drill jig comprising supporting and guiding means, a pair of opposed master jaws slidable in the guide means, a clamping screw associated with the master jaws, said clamping screw serving to move the jaws equidistantly toward and from the meeting plane of the jaws, jig plate locating studs secured to the supporting and guiding means in fixed relation to the meeting plane of the jaws, said studs being in pairs on either side of the axis of the clamping screw, the pairs having different spacing between members of a pair, and a jig plate having an opening to fit one of a pair of studs and a side opening recess adapted to fit around the other of the pair of studs.

2. A drill jig comprising supporting and guiding means, a pair of opposed master jaws slidable in the guide means, a clamping screw associated with the master jaws, said clamping screw serving to move the jaws equidistantly toward and from the meeting plane of the jaws, jig plate locating studs secured to the supporting and guiding means in fixed relation to the meeting plane of the jaws, said studs being in pairs on either side of the axis of the clamping screw, the pairs having different spacing between members of a pair, and a jig plate having an opening to fit one of a pair of studs, a side opening recess adapted to fit around the other of the pair of studs, and spring means adapted to retain a stud in said recess.

References Cited in the file of this patent

UNITED STATES PATENTS

| | | |
|---|---|---|
| 668,695 | Stevens | Feb. 26, 1901 |
| 787,893 | Christoph | Apr. 25, 1905 |
| 1,381,196 | John | June 14, 1921 |
| 1,440,388 | Jeffrey | Jan. 2, 1923 |
| 2,340,508 | Cooke et al. | Feb. 1, 1944 |